United States Patent [19]
Lawrie

[11] 3,795,780
[45] Mar. 5, 1974

[54] ACCELERATION SENSOR WITH MAGNETIC OPERATED, OSCILLATING REED SWITCH

[75] Inventor: George S. Lawrie, Thornhill, Ontario, Canada

[73] Assignee: The Garrett Corporation, Los Angeles, Calif.

[22] Filed: Aug. 11, 1972

[21] Appl. No.: 280,004

[52] U.S. Cl...... 200/61.45 R, 200/61.49, 200/61.51
[51] Int. Cl. ......................................... H01h 35/02
[58] Field of Search .. 200/61.45 R, 61.45 M, 61.53, 200/81.9 M; 335/205–207

[56] References Cited
UNITED STATES PATENTS

| | | | |
|---|---|---|---|
| 2,892,051 | 6/1959 | Moore | 200/81.9 M |
| 2,963,563 | 12/1960 | Patterson | 200/81.9 M |
| 3,608,472 | 9/1971 | Pelster et al. | 200/81.9 M |
| 3,515,827 | 6/1970 | Beeker | 200/81.9 M |
| 3,421,124 | 1/1969 | Kidd | 200/81.9 M X |
| 3,057,977 | 10/1962 | Caswell | 200/81.9 M |

Primary Examiner—James R. Scott
Attorney, Agent, or Firm—Orville R. Seidner; Ben E. Lofstedt; Albert J. Miller

[57] ABSTRACT

A magnetized seismic mass is annular in form, disposed around an elongated hollow tubular body which encloses a magnetic switch. A helical coil spring disposed around the body biases the mass toward one end of the body which is flexibly suspended from a support by a flexible cable.

10 Claims, 3 Drawing Figures

3,795,780

ACCELERATION SENSOR WITH MAGNETIC OPERATED, OSCILLATING REED SWITCH

BACKGROUND OF THE INVENTION

This invention relates to acceleration sensors and is particularly concerned with a switching sensor flexibly mounted to align itself with the direction of applied acceleration over any direction within a hemisphere.

An object of this invention is to provide a simple economical switch that responds to the acceleration forces that may be present during the crash of an aircraft, and which remains relatively insensitive to short duration impulses such as normal aircraft vibrations and ground handling shocks.

Another object of this invention is to provide an acceleration sensor switch which is particularly suited to sensing the forces which may exist during the crash of a rotary winged aircraft such as a helicopter. In such cases the motion at the time of impact may not generally be assumed to be along the normal flight axis, but can be in any direction within or below a horizontal plane through the centre of gravity of the vehicle. It is therefore an object of this invention to provide a sensor switch which will reliably and predictably detect crash accelerations over a range of directions as likely to be encountered in the crash of a helicopter. It will be understood, of course, that the usefulness of the invention is not limited to its use with helicopters or other types of airborne or ground born vehicles.

SUMMARY OF THE INVENTION

This invention overcomes many limitations of prior art devices by providing a seismic mass having a magnetic field and arranged for linear translational movement along a columnar body against the bias of a spring force. Preferably the body is an elongate hollow element with a switch disposed within it, the switch being sensitive to the magnetic field of the seismic mass for actuation from one switched state to another state when the mass has traveled a predetermined distance against the force of the spring. Preferably the mass is annular in form and the spring is helical and disposed about the hollow columnar body.

The entire device is preferably suspended by a flexible cable, and may be disposed within a container having a damping fluid therein to restrain the device from experiencing excessive motion and hence to prevent premature fatigue of the suspension cable.

DESCRIPTION OF THE PREFERRED EMBODIMENT

Figure 1:
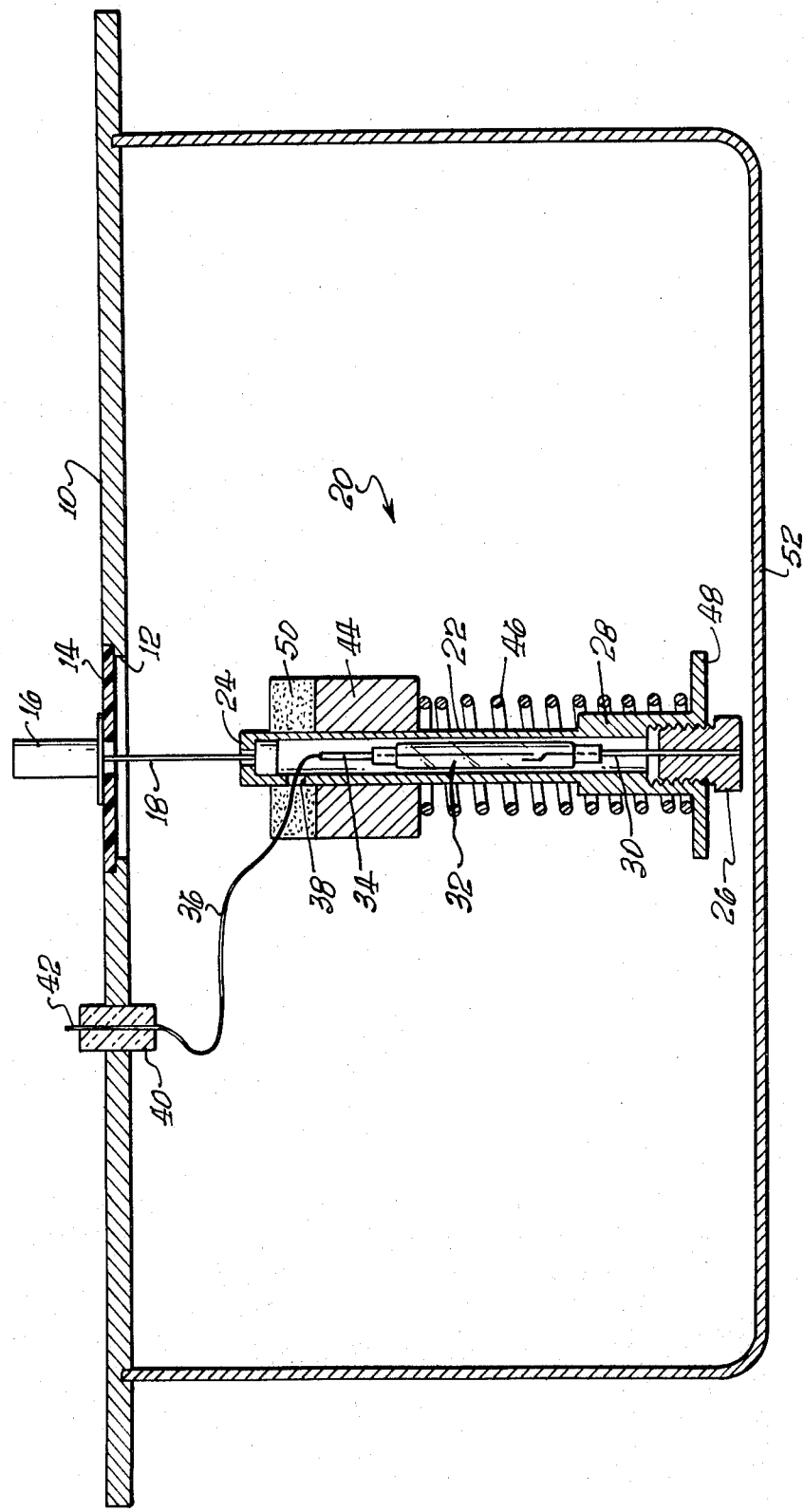
FIG. 1 depicts a vertical section of a preferred embodiment of the invention in elevation shown in its inactivated position.

With continued reference to the figures, FIG. 1 discloses a support and cover plate 10 having a central opening 12 over which is disposed a diaphragm 14 having an electrically insulated centrally fixed support and connection electrode element 16 secured thereto and extending outwardly from the upper surface of the plate 10. The diaphragm 14 may be comprised of a laminated phenolic insulating material in order to insulate the electrode 16 electrically from the plate 10, the diaphragm being secured to the plate 10 by an epoxy cement, for example, or any preferred bonding means.

Depending from the lower end of the electrode 16, and suspended therefrom by a flexible cable 18, is the sensor assembly 20 which comprises an elongate tubular body 22 closed at its upper end 24 to which the lower end of the cable 18 is secured, the upper end of the cable being secured to the electrode 16.

A plug 26 is threadably received in the lower end 28 of the body 22, the plug 26 having disposed within an axial bore the electrode 30 of a magnetic reed switch 32. The other electrode 34 of the switch 32 has secured thereto one end of a flexible lead wire 36 which passes freely through a radial passageway 38 in the body 22, the other end of the wire 36 being fixedly disposed in an insulator plug 40 which is secured in a passageway through the cover 10.

Figure 2:
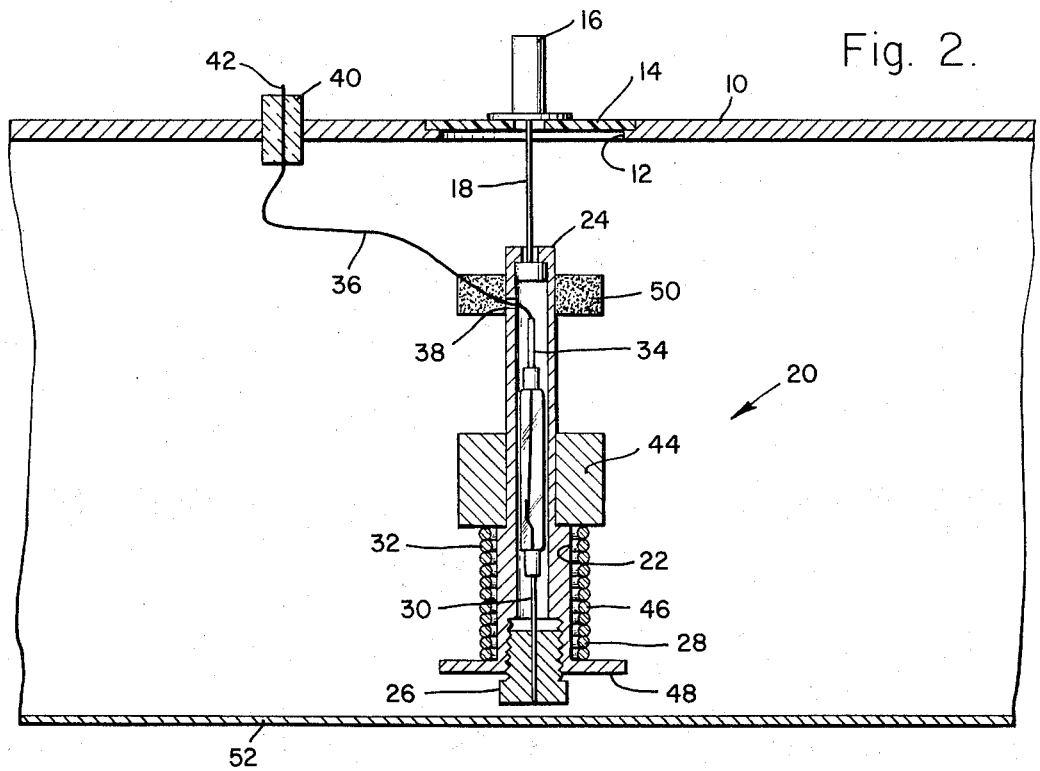
FIG. 2 is a vertical section of the invention shown in its activated position.

With particular reference now to FIG. 2, it is clearly shown that the arrangement is such that when the switch 32 is closed an electrical circuit is completed from the electrode 16 through the cable 18, the body 22, plug 26, electrode 30 of switch 32, electrode 34 thereof, and lead wire 36 to the outer end 42 thereof. The switch 32 is adapted to have its contact elements closed when a magnetic field is provided. In this embodiment the field is supplied by a magnetized seismic mass 44 disposed around the body 22 and arranged for movement along its axis.

Resilient means, comprising a helically coiled spring 46, are disposed between a stop means or flange 48 formed on the lower end 28 of the body 22 and the mass 44 so as to urge the latter in the opposite direction to that which it would normally be accelerated by gravity. By this means, the magnetic field of the mass 44 is normally displaced from adjacent the magnetically sensitive contacts of the switch 32. A collar 50, preferably comprised of a resilient material such as polyurethane, is secured adjacent the upper end 24 of the body 22 so as to restrain upward movement of the mass 44. The collar 50 may be conveniently cemented to the body 22 adjacent the passageway 38 for the wire lead 36 which may be threaded through a slit or hole in the collar 50. In this manner the collar provides a damping support for the upper electrode 34 of the switch 32, as well as a vibration damper for minor oscillatory accelerations imparted to the mass 44.

Figure 3:
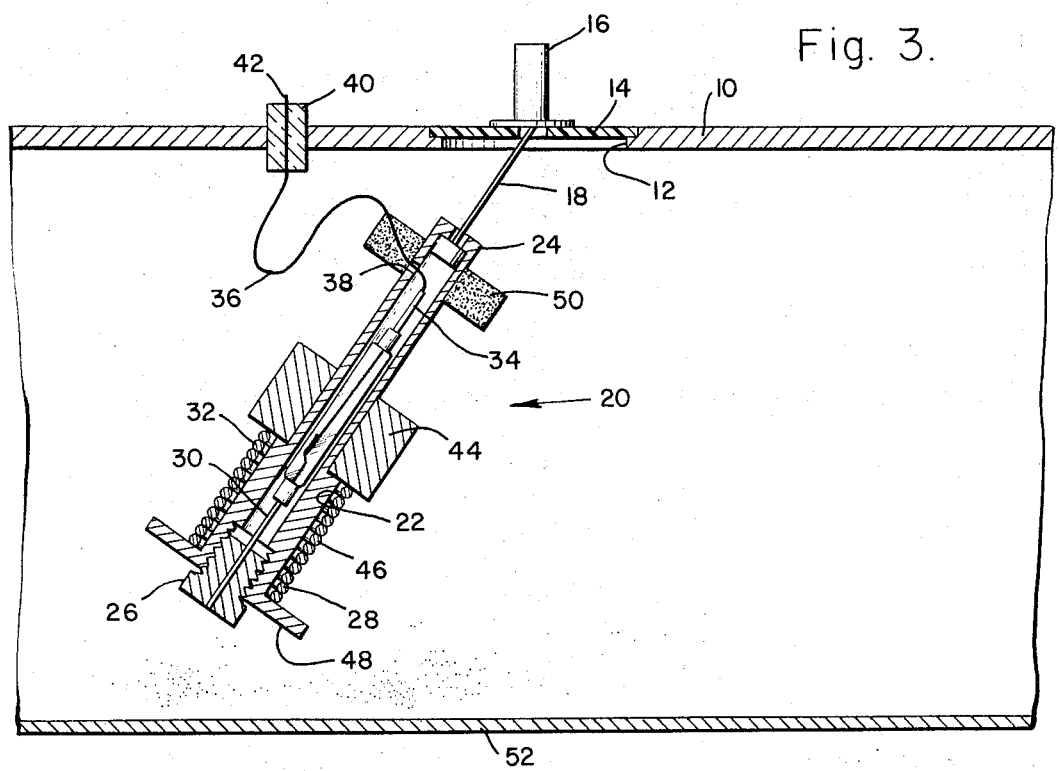
FIG. 3 is a vertical section of the present invention shown activated and disposed in a pendulous position.

A protective housing cover 52 is disposed to enclose the sensor assembly 20, and to this end it may be secured to the cover plate 10 by any preferred means, not shown, as for example by an epoxy cement. It is seen as clearly shown and depicted in FIG. 3 that the side walls of the cover 52 are disposed at some distance from the normal axis of the sensor 20 in order to permit the assembly to swing on its attaching cable 18 from the normal axis when the vehicle to which the cover 10 is secured acquires an attitude other than horizontal. That is, if the sensor 20 is utilized with a helicopter, for example, to the frame of which the cover 10 is secured, the sensor assembly 20 can swing from the normal with changes of vehicular attitude, and thus be in a position of alignment with the force of gravity in order most effectively to perform its function as an acceleration sensor in the event of a crash.

If desired the protective cover 52 may contain viscous damping fluid to the extent necessary to restrain the sensor 20 in general, and the seismic mass 44 thereof in particular, from experiencing excessive motion when the sensor may be subjected to continuous transverse vibration. By this means, premature fatigue of the flexible cable 18 is averted.

In use the disclosed device would be mounted on the vehicle or apparatus which may be subjected to acceleration of such nature that a signal is to be given or displayed. To that end the cover 10 is secured by bolts or any preferred means in a horizontal position to the vehicle, craft, or apparatus. The electrode 16 and lead wire end 42 would then be coupled to electrical apparatus adapted to be activated upon the occurrence of a predetermined accleration along the axis of the sensor 20, at which time the seismic mass 44 moves axially along the tubular body 22 against the force of the spring 46 until the magnetic field of the mass 44 causes the magnetic contacts of the switch 32 to close the external electrical circuit. The circuit, not shown, may include signal lights, a controlled device or radio transmitter.

What I claim is:

1. An acceleration sensor switch comprising:
   a. a seismic mass provided with a magnetic field;
   b. a columnar body disposed adjacent said seismic mass for substantially linear translational movement of said mass relative to said body, said mass being freely movable relative to said body substantially without restraint thereby;
   c. stop means on said body adjacent one end thereof;
   d. resilient spring means disposed between said seismic mass and said stop means, said spring means biasing said mass away from said stop means toward the other end of said body;
   e. support means securing the other end of said body against linear translational movement while permitting non-linear translational movement of said body; and
   f. switch means sensitive to a magnetic field and mounted on said body and adapted to actuation from one switched state to another by the magnetic field of said mass upon movement thereof for a predetermined distance during said translational movement from said other end of said body toward said stop means.

2. The switch of claim 1 in which said seismic mass is annular in form and disposed about said body.

3. The switch of claim 2 in which said body comprises an elongate tubular member with said switch means disposed therewithin.

4. The switch of claim 3 in which said stop means comprises a flange member outstanding from said body,
   said resilient spring means comprising a helical spring disposed about said body.

5. The switch of claim 4 in which said support means comprises flexible cable means.

6. The switch of claim 5 enclosed in a housing cover and provided with damping fluid therein.

7. The switch of claim 6 in which one end of said flexible cable means is anchored to said housing cover.

8. The switch of claim 5 in which said flexible cable means comprises an electrically conductive cable.

9. The switch of claim 1 in which said switch further comprises:
   another stop means on said body adjacent the other end thereof.

10. The switch of claim 9 in which said another stop means comprises:
    a vibration-dampening collar member outstanding from said body, annular in form and disposed about said other end of said body.

* * * * *